US012735089B2

(12) United States Patent
Lee

(10) Patent No.: US 12,735,089 B2
(45) Date of Patent: Sep. 15, 2026

(54) SPEED REDUCER FOR ELECTRIC POWER STEERING SYSTEM

(71) Applicant: HL MANDO CORPORATION, Pyeongtaek (KR)

(72) Inventor: Kyeongho Lee, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 636 days.

(21) Appl. No.: 18/155,810

(22) Filed: Jan. 18, 2023

(65) Prior Publication Data

US 2023/0257018 A1 Aug. 17, 2023

(30) Foreign Application Priority Data

Jan. 25, 2022 (KR) ........................ 10-2022-0011018

(51) Int. Cl.
*B62D 5/04* (2006.01)
*F16H 57/027* (2012.01)
*F16H 57/039* (2012.01)

(52) U.S. Cl.
CPC ......... *B62D 5/0403* (2013.01); *B62D 5/0409* (2013.01); *F16H 57/027* (2013.01); *F16H 57/039* (2013.01)

(58) Field of Classification Search
CPC ... B62D 5/0403; B62D 5/0409; F16H 57/027; F16H 57/039
USPC .......................................................... 180/444
See application file for complete search history.

(56) References Cited

U.S. PATENT DOCUMENTS

| | | | | |
|---|---|---|---|---|
| 4,642,097 A * | 2/1987 | Siposs | F16K 15/147 | |
| | | | 604/32 | |
| 2013/0180794 A1* | 7/2013 | Shiino | B62D 5/0409 | |
| | | | 180/444 | |
| 2021/0197885 A1* | 7/2021 | Amano | B62D 5/0403 | |

FOREIGN PATENT DOCUMENTS

| | | | |
|---|---|---|---|
| JP | 2007210588 A * | 8/2007 | F16H 57/0406 |
| JP | 2020111109 A * | 7/2020 | |
| KR | 20110076112 A * | 7/2011 | B62D 7/22 |
| KR | 20130005854 U * | 10/2013 | F16K 15/147 |

* cited by examiner

*Primary Examiner* — Valentin Neacsu
*Assistant Examiner* — Mohamed M Medani
(74) *Attorney, Agent, or Firm* — Harvest IP Law, LLP

(57) ABSTRACT

A speed reducer for an electric power steering system according to an embodiment of the present disclosure includes a gear housing, a plurality of air flow passages, and check valves. The gear housing accommodates a worm shaft and a worm wheel. The plurality of air flow passages is formed in the gear housing and connects the outside of the gear housing and a sealed space formed in the gear housing. The check valves are respectively disposed in the plurality of air flow passages.

18 Claims, 9 Drawing Sheets

SPEED REDUCER FOR ELECTRIC POWER STEERING SYSTEM

CROSS-REFERENCE TO RELATED APPLICATION(S)

This application claims benefit and priority to Korean Patent Application No. 10-2022-0011018, filed on Jan. 25, 2022, with the Korean Intellectual Property Office, the disclosure of which is incorporated herein in its entirety by reference.

TECHNICAL FIELD

The present disclosure relates to a speed reducer for an electric power steering system, and more particularly, to a speed reducer for an electric power steering system, which is capable of preventing back pressure in a gear housing of the speed reducer.

BACKGROUND

A speed reducer is used for an electric power steering system (EPS) for a vehicle.

A worm shaft and a worm wheel, which are disposed in a gear housing of the speed reducer, amplify an output of a motor by reducing a rotational speed of an output shaft of the motor. The amplified output of the motor is transmitted to a steering mechanism (a connection mechanism related to steering).

A rotational force of the speed reducer, which is made by an operation of the motor, is transmitted to the steering mechanism together with a rotational force of a steering wheel operated by a driver, thereby assisting a steering force of the driver in operating the steering wheel.

The worm shaft and the worm wheel are disposed in the gear housing of the speed reducer in a state in which teeth formed on the worm shaft engage with teeth formed on the worm wheel. Further, worm shaft bearings are disposed at one side and the other side of the worm shaft and support the worm shaft while allowing the worm shaft to smoothly rotate. FIG. 1 is a schematically illustrating an arrangement relationship between the worm shaft and the worm shaft bearing of the speed reducer.

A rubber sealed type bearing (hereinafter, referred to as a 'seal bearing') is used as a worm shaft bearing 40 disposed at one side of a worm shaft 20 to prevent noise caused by introduction of foreign substances into the worm shaft bearing. Reference numeral 41 indicates a worm shaft bearing 40 disposed at the other side of the worm shaft 20.

In case that the worm shaft 20 and the seal bearing 40 are assembled in a gear housing 10, a space disposed below the seal bearing 40 in the gear housing 10 is sealed by using the seal bearing 40. A damper 50 is disposed in a space S disposed below the seal bearing 40.

For example, to assemble the worm shaft 20 and the seal bearing 40 in the gear housing 10, an operator fits the worm shaft 20 with an inner race of the seal bearing 40 and inserts the seal bearing 40 into the gear housing 10 together with the worm shaft 20. In this case, pressure in the space S below the seal bearing 40 is raised (back pressure caused by sealing), and the pressure is raised by compression of the damper 50 (back pressure caused by compression of the damper). The back pressure pushes out the seal bearing 40 and the worm shaft 20.

The occurrence of back pressure causes an assembling defect of the speed reducer, increases rotational torque of the worm shaft, and makes damping performance of the damper non-uniform.

SUMMARY

The present disclosure has been made in an effort to solve the above-mentioned problem, and an object of the present disclosure is to provide a speed reducer for an electric power steering system, which is capable of blocking introduction of foreign substances while preventing back pressure from occurring in a gear housing of the speed reducer.

However, the object to be achieved by the present disclosure is not limited to the above-mentioned objects but may be variously expanded without departing from the spirit and scope of the present disclosure.

To achieve the object of the present disclosure, exemplary embodiments of the present disclosure provide a speed reducer for an electric power steering system, in which an air flow passage may be provided in a gear housing, and a check valve may be disposed (mounted) in the air flow passage, such that back pressure may be prevented from occurring in the gear housing, and foreign substances may be prevented from being introduced through the air flow passage.

The speed reducer for an electric power steering system according to the embodiment of the present disclosure includes a gear housing, a plurality of air flow passages, and check valves. The gear housing accommodates a worm shaft and a worm wheel. The plurality of air flow passages is formed in the gear housing and connects the outside of the gear housing and a sealed space formed in the gear housing. The check valves are respectively disposed in the plurality of air flow passages.

According to the embodiment, worm shaft bearings are respectively disposed at one side and the other side of the worm shaft in the gear housing. The worm shaft bearing disposed at one side of the worm shaft may be a seal bearing. The sealed space may be a space having a predetermined size and formed below the seal bearing.

According to the embodiment of the present disclosure, the check valve may include: a body portion having a cylindrical tubular shape; a stepped portion formed at one side of the body portion; and a duckbill portion formed at the other side of the body portion.

According to the embodiment of the present disclosure, air may flow while sequentially passing through the stepped portion, the body portion, and the duckbill portion and cannot flow while sequentially passing through the duckbill portion, the body portion, and the stepped portion.

According to the embodiment of the present disclosure, the stepped portion may be provided at one side of the body portion along an outer peripheral surface of the body portion and extend or protrude in a direction perpendicular to a longitudinal direction of the body portion.

According to the embodiment of the present disclosure, the duckbill portion may include two inclined surfaces and a slit. The two inclined surfaces may each be inclined at a predetermined gradient from a part of the other side of the body portion to an end of the other side of the body portion. The slit may be formed at the end of the other side of the body portion and have a predetermined length. The two inclined surfaces may be formed to face each other based on the slit.

According to the embodiment of the present disclosure, the duckbill portion may further include a cover configured to cover the slit. The cover may extend or protrude from the end of the other side of the body portion.

According to the embodiment of the present disclosure, the check valve may be a duckbill valve and made of rubber, silicone, or synthetic elastomer.

According to the embodiment of the present disclosure, a damper may be disposed in the sealed space.

According to the embodiment of the present disclosure, a first check valve, which is one of the check valves respectively disposed in the plurality of air flow passages, may allow air to flow to the outside of the gear housing from the sealed space.

According to the embodiment of the present disclosure, the first check valve may include: a body portion having a cylindrical tubular shape; a stepped portion formed at one side of the body portion; and a duckbill portion formed at the other side of the body portion, and the stepped portion may be disposed in the sealed space.

According to the embodiment of the present disclosure, a second check valve, which is one of the check valves respectively disposed in the plurality of air flow passages, may allow air to flow to the sealed space from the outside of the gear housing.

According to the embodiment of the present disclosure, the second check valve may include: a body portion having a cylindrical tubular shape; a stepped portion formed at one side of the body portion; and a duckbill portion formed at the other side of the body portion, and the stepped portion may be disposed to be exposed to the outside of the gear housing.

The speed reducer for an electric power steering system according to the embodiment of the present disclosure inhibits the occurrence of back pressure in the gear housing.

The assembling properties of the speed reducer are improved.

The rotational torque of the worm shaft is constantly maintained.

The damping performance of the damper is uniformized.

The introduction of foreign substances is blocked.

However, the effect of the present disclosure is not limited to the above-mentioned effects but may be variously expanded without departing from the spirit and scope of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
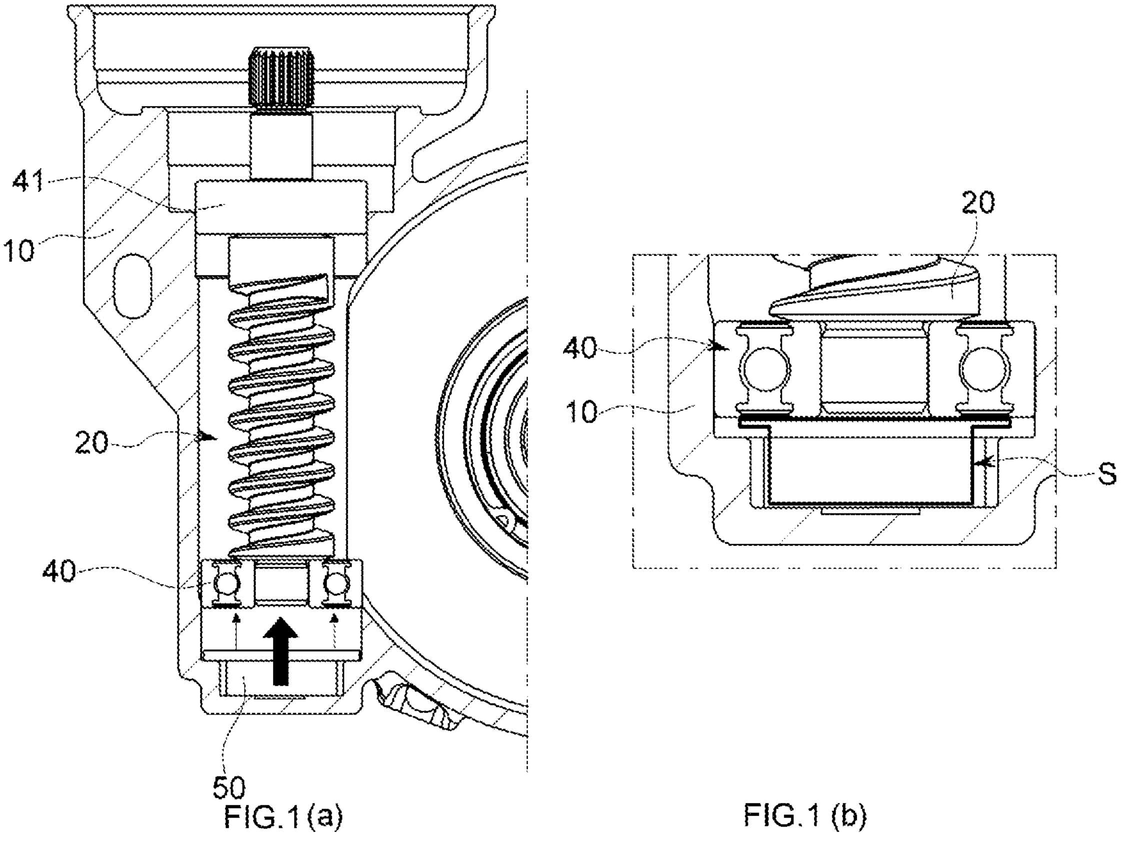
FIG. 1(*a*) & FIG. 1(*b*) are a schematically illustrating an arrangement relationship between a worm shaft and a worm shaft bearing of a speed reducer.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in more detail with reference to the accompanying drawings. The specific description of constituent elements of the present disclosure will be omitted in order not to obscure the subject matter of the present disclosure if the constituent elements can be easily reproduced and clearly understand, from the related art, by those skilled in the art.

The position on/above or under/below the layer will be described based on the drawings. A thickness or a size of each layer in the drawings is exaggerated, omitted, or schematically illustrated for the purpose of clarity and for convenience of description. In addition, a size of each constituent element does not entirely reflect an actual size.

Hereinafter, a speed reducer for an electric power steering system according to an embodiment of the present disclosure will be described.

Figure 2:
FIG. 2 is a view illustrating a speed reducer for an electric power steering system according to an embodiment of the present disclosure.
Figure 2:
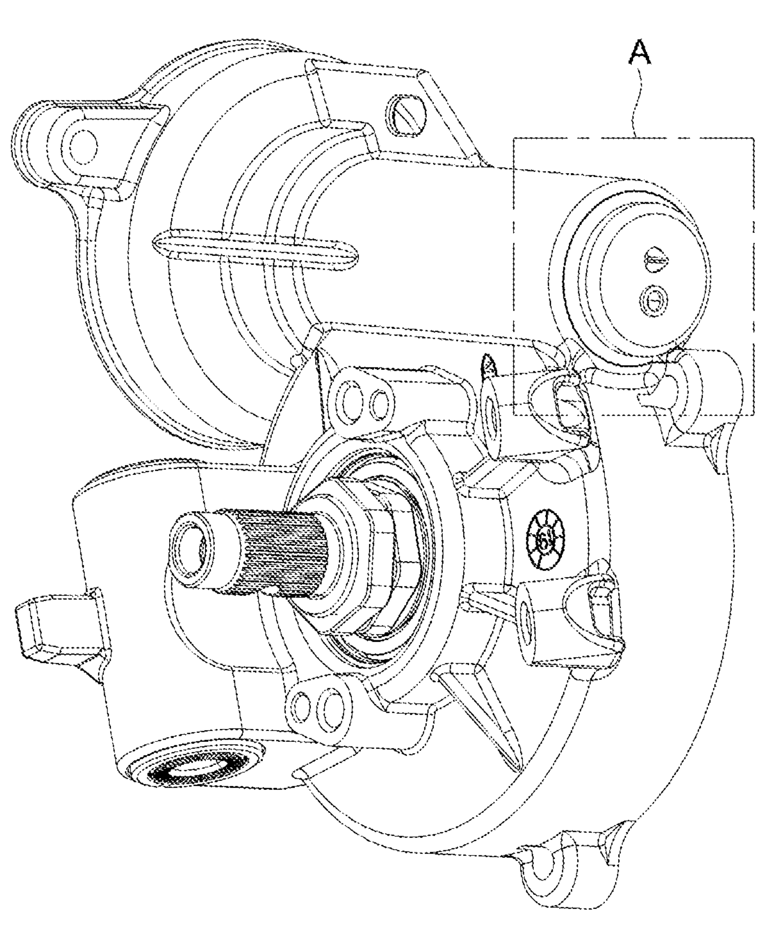
Figure 3:
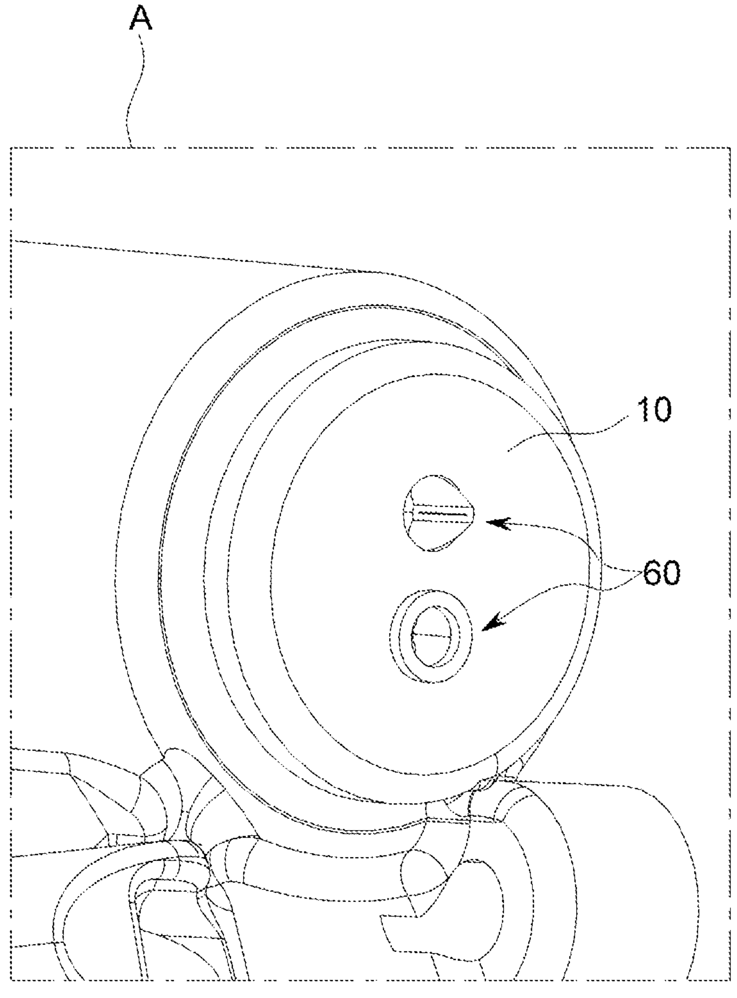
FIG. 3 is an enlarged view of part A in FIG. 2.
Figure 4:
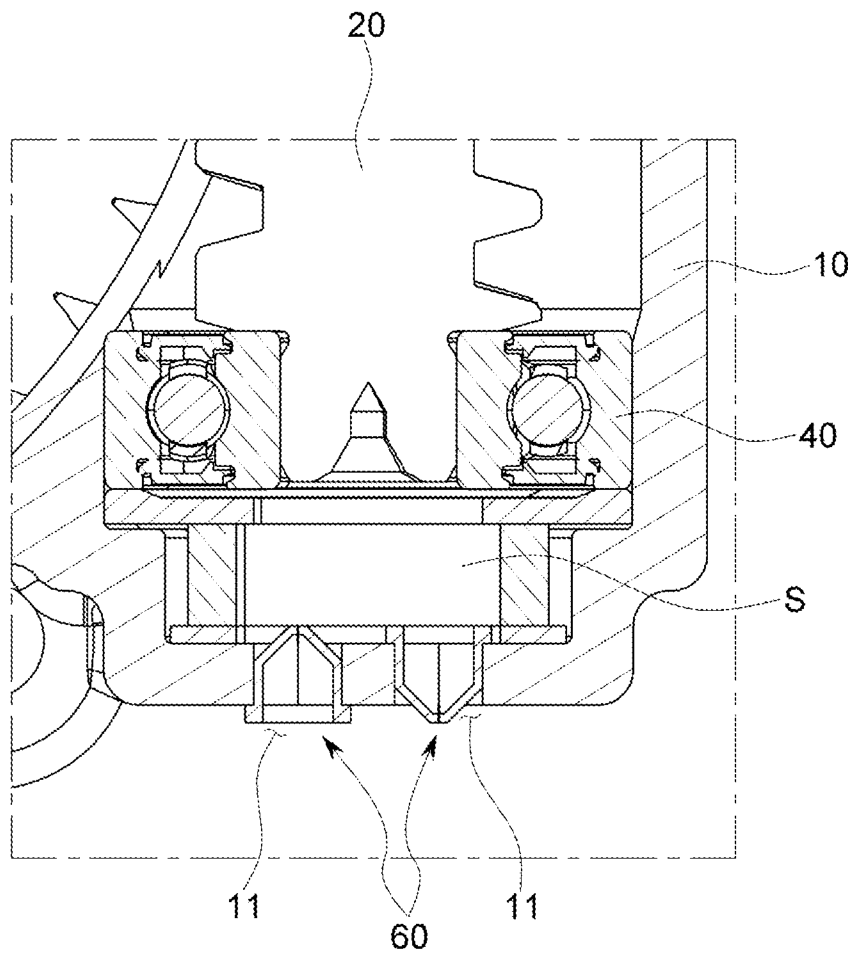
FIG. 4 is a view illustrating an embodiment in which a check valve is disposed in a gear housing in FIG. 2.

FIG. 2 is a view illustrating a speed reducer for an electric power steering system according to an embodiment of the present disclosure, FIG. 3 is an enlarged view of part A in FIG. 2, and FIG. 4 is a view illustrating an embodiment in which a check valve is disposed in a gear housing in FIG. 2.

Referring to FIGS. 1 to 4, a speed reducer 1 for an electric power steering system according to an embodiment of the present disclosure includes a gear housing 10, a plurality of air flow passages 11, and check valves 60. The gear housing 10 accommodates a worm shaft 20 and a worm wheel (not illustrated). The plurality of air flow passages 11 is air flow passages formed in the gear housing 10 and configured to connect the outside of the gear housing 10 and a sealed space S formed in the gear housing 10. The check valves 60 are respectively disposed in the plurality of air flow passages 11. Hereinafter, the constituent elements will be specifically described.

The gear housing 10 defines an external appearance of the speed reducer 1.

The worm shaft 20, the worm wheel, worm shaft bearings 40 and 41, and a damper 50 are disposed in the gear housing 10.

The worm shaft 20 and the worm wheel, which are disposed in the gear housing 10 of the speed reducer 1, amplify an output of a motor (not illustrated) by reducing a rotational speed of an output shaft of the motor. The amplified output of the motor is transmitted to a steering mechanism (a connection mechanism related to steering).

The worm shaft 20 is connected to the output shaft (or a rotary shaft) of the motor. Further, the worm shaft 20 and the worm wheel are disposed in a state in which teeth formed on the worm shaft 20 engage with teeth formed on the worm wheel.

Assuming that an electric power unit includes the motor, the speed reducer, a controller, and a torque sensor that constitute the electric power steering system, an electric power steering system, in which the electric power unit is mounted on a steering column, is generally called a column type electric power steering system.

In general, in the case of the column type electric power steering system, the worm wheel is connected to a steering shaft (column shaft) of the steering mechanism. The output shaft of the motor is connected to the worm shaft 20, the worm shaft 20 is connected to the worm wheel, and the worm wheel is coupled to the steering shaft (column shaft).

Therefore, when the output shaft of the motor is rotated by an operation of the motor, a rotational force of the output shaft of the motor is transmitted to the steering shaft (column shaft), such that the steering shaft (column shaft) is also rotated.

The output of the motor is amplified by the speed reducer 1, and a rotational force of the speed reducer 1 is transmitted to the steering mechanism together with a rotational force of a steering wheel operated by a driver. The electric power unit assists the steering force of the driver who operates the steering wheel.

The worm shaft bearings 40 and 41 disposed in the gear housing 10 are respectively fastened to one side and the other side of the worm shaft 20 and support the worm shaft 20 while allowing the worm shaft 20 to smoothly rotate. In case that the worm shaft 20 is connected to the motor, a distance between the motor and one side of the worm shaft 20 is longer than a distance between the motor and the other side of the worm shaft 20 (see FIG. 1).

A rubber sealed type bearing (hereinafter, referred to as a 'seal bearing') is used as the worm shaft bearing 40 disposed at one side of the worm shaft 20 to prevent noise caused by introduction of foreign substances into the worm shaft bearing.

The worm shaft bearing 41 disposed at the other side of the worm shaft 20 is a bearing that is not sealed by rubber.

In case that the worm shaft 20 and the seal bearing 40 are assembled in the gear housing 10, the space S having a predetermined size is formed below the seal bearing 40 in the gear housing 10. The damper 50 is disposed in the space S having the predetermined size. The space S having the predetermined size is sealed by using the seal bearing 40. Hereinafter, the space S having the predetermined size is referred to as a 'sealed space S'.

For example, to assemble the worm shaft 20 and the seal bearing 40 in the gear housing 10, an operator fits the worm shaft 20 with an inner race of the seal bearing 40 and inserts the seal bearing 40 into the gear housing 10 together with the worm shaft 20. In this case, pressure in the sealed space S is raised (back pressure caused by sealing), and the pressure is raised by compression of the damper 50 (back pressure caused by compression of the damper 50). The back pressure pushes the seal bearing 40 and the worm shaft 20, causes an assembling defect of the speed reducer 1, increases rotational torque of the worm shaft 20, and makes damping performance of the damper 50 non-uniform.

The air flow passages 11 (see FIG. 4) are formed in the gear housing 10. Specifically, the air flow passages 11 are formed in the gear housing 10 that defines (surrounds) the sealed space S in the gear housing.

The air flow passage 11 is a hole that connects the sealed space S and the outside of the gear housing 10.

Air may flow to the outside of the gear housing 10 from the sealed space S or flow to the sealed space S from the outside of the gear housing 10 through the air flow passage 11.

The air flow passage 11 may be provided as a plurality of air flow passages 11 in the gear housing 10.

The check valves 60 are respectively disposed in the plurality of air flow passages 11.

The check valve 60 is disposed (mounted) in the air flow passage 11 formed in the gear housing 10.

The check valve 60 is a valve that allows a fluid such as air to flow only in one direction and prevents the fluid from flowing in the opposite direction.

One of the check valves 60 respectively disposed in the plurality of air flow passages 11 allows the air to flow to the outside of the gear housing 10 from the sealed space S through the check valve 60. In addition, another check valve 60 allows the air to flow to the sealed space S from the outside of the gear housing 10 through the check valve 60.

The check valve 60 (hereinafter, referred to as a 'first check valve 60'), which allows the air to flow to the outside of the gear housing 10 from the sealed space S, and the check valve 60 (hereinafter, referred to as a 'second check valve 60'), which allows the air to flow to the sealed space S from the outside of the gear housing 10, may be identical or different from each other in shape. FIGS. 3 and 4 illustrate an embodiment in which the two the check valves 60 have the same shape and are disposed in the opposite directions. One check valve 60 is the first check valve 60, and the other check valve 60 is the second check valve 60.

The check valve 60 may be a duckbill valve.

The duckbill valve, which is the check valve 60, may be made of rubber, silicone, and/or synthetic elastomer.

The check valves 60 (duckbill valves) having various shapes may be mounted in the speed reducer 1 for an electric power steering system according to the embodiment of the present disclosure.

Figure 5:
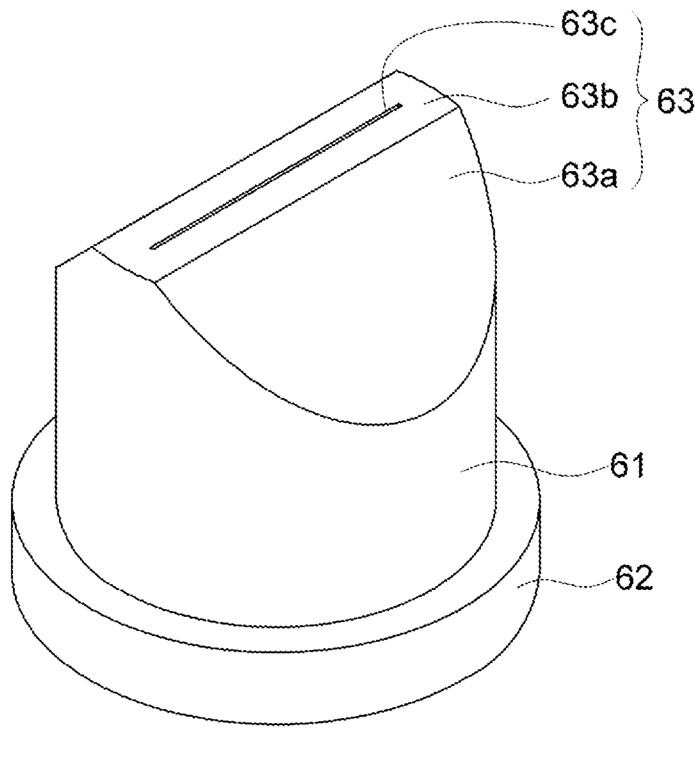
FIGS. 5 to 7 are views illustrating a first embodiment of the check valve.
Figure 6:
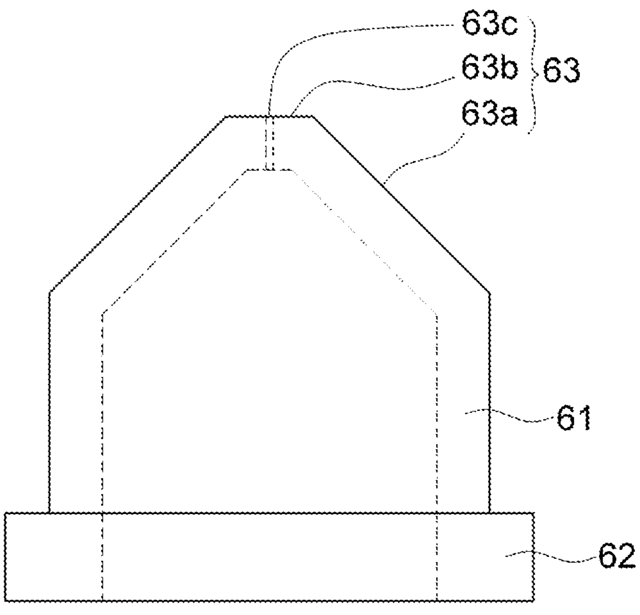
Figure 7:
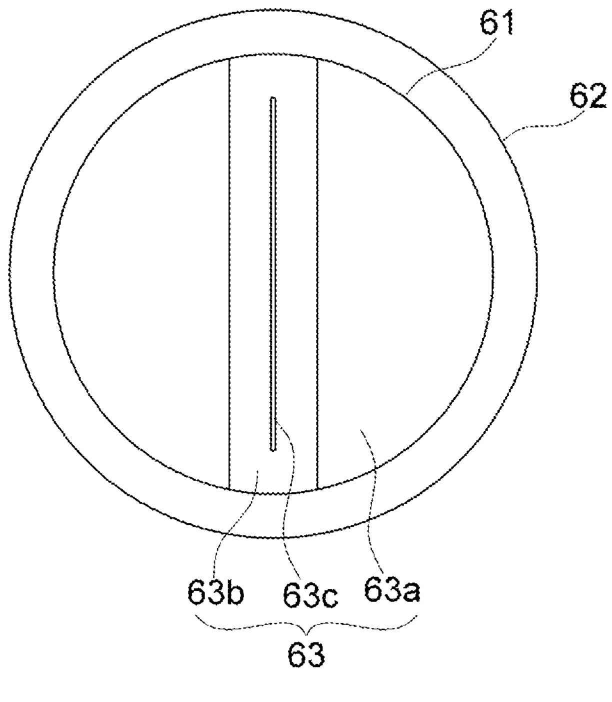

FIGS. 5 to 7 are views illustrating a first embodiment of the check valve.

Referring to FIGS. 5 to 7, the first embodiment of the check valve 60 includes a body portion 61 having a cylindrical tubular shape, a stepped portion 62 formed at one side of the body portion 61, and a duckbill portion 63 disposed at the other side of the body portion 61. The body portion 61, the stepped portion 62, and the duckbill portion 63 may be integrated. The air may flow while sequentially passing through the stepped portion 62, the body portion 61, and the duckbill portion 63, but cannot flow while sequentially passing through the duckbill portion 63, the body portion 61, and the stepped portion 62 in the reverse order.

The body portion 61 has a cylindrical tubular shape having a predetermined length and having a through-hole in a longitudinal direction. The air may flow through the through-hole.

The stepped portion 62 is formed at one side of the body portion 61.

The stepped portion 62 is provided at one side of the body portion 61 along an outer peripheral surface of the body portion 61 and extends or protrudes in a direction perpendicular to the longitudinal direction of the body portion 61. Therefore, a level difference is formed between the outer peripheral surface of the body portion 61 and a lateral surface of the stepped portion 62 by a length by which the stepped portion 62 extends or protrudes.

The stepped portion 62 may prevent the check valve 60 from separating from the air flow passage 11. That is, in the case of the first check valve 60, the stepped portion 62 may be disposed in the sealed space S and prevent the first check valve 60 from separating from the gear housing 10 to the outside when the air flows. In addition, in the case of the second check valve 60, the stepped portion 62 may be disposed to be exposed to the outside of the gear housing 10 and prevent the second check valve 60 from entering the sealed space S when the air flows.

The duckbill portion 63 is formed at the other side of the body portion 61.

The duckbill portion 63 includes two inclined surfaces 63*a* and a slit 63*c*.

Specifically, the duckbill portion 63 has the two inclined surfaces 63*a* inclined at a predetermined gradient from a part of the other side of the body portion 61 to an end 63*b* of the other side of the body portion 61. The two inclined surfaces 63*a* are formed to face each other.

In the duckbill portion 63, a diameter of the through-hole of the body portion 61 gradually decreases. That is, the diameter of the through-hole of the body portion 61 gradually decreases from a part of the other side of the body portion 61 to the end 63*b* of the other side of the body portion 61.

The two inclined surfaces 63*a* are formed to face each other. The slit 63*c* having a predetermined length is formed at the end 63*b* of the other side of the body portion 61. The slit 63*c* refers to a narrow-elongated hole. The two inclined surfaces 63*a* are (symmetrically) formed to face each other based on the slit 63*c*.

The check valve 60 (particularly, the duckbill portion 63) may be made of rubber, silicone, and/or synthetic elastomer and elastically deformed when the check valve 60 is pressed by an external force.

In case that the air flows while sequentially passing through the stepped portion 62, the body portion 61, and the duckbill portion 63 through the through-hole in the body portion 61, the air presses inner surfaces of the inclined surfaces 63*a* of the duckbill portion 63. The two inclined surfaces 63*a* are elastically deformed by being pressed by the air. The slit 63*c* is widely opened by the elastic deformation of the inclined surfaces 63*a*, such that the air, which presses the inclined surfaces 63*a*, may flow to the outside through the slit 63*c*.

On the contrary, in case that the air presses the duckbill portion 63 from the outside of the check valve 60, the air presses outer surfaces of the inclined surfaces 63*a* of the duckbill portion 63. The two inclined surfaces 63*a* are elastically deformed by being pressed by the air. The slit 63*c* is closed by the elastic deformation of the inclined surfaces 63*a*, such that the air existing outside the check valve 60 cannot flow into the check valve 60 through the slit 63*c*.

Therefore, when the back pressure occurs in the sealed space S, the air existing in the sealed space S flows to the outside of the gear housing 10 through the first check valve 60. Therefore, the back pressure in the sealed space S is eliminated.

The first check valve 60 serves as an air flow path that enables the air existing in the sealed space S to flow to the outside of the gear housing 10 in case that the worm shaft 20 and the seal bearing 40 are assembled in the gear housing 10 and in case that the worm shaft 20 moves downward (this means a case in which the worm shaft 20 rotates in one direction).

The second check valve 60 serves as an air flow path that enables the air existing outside the gear housing 10 to flow into the sealed space S when the back pressure in the sealed space S is eliminated and in case that the worm shaft 20 moves upward (this means that the worm shaft 20 rotates in a direction opposite to one direction). The second check valve 60 may block foreign substances to prevent introduction of foreign substances when the air flows into the sealed space S.

Figure 8:
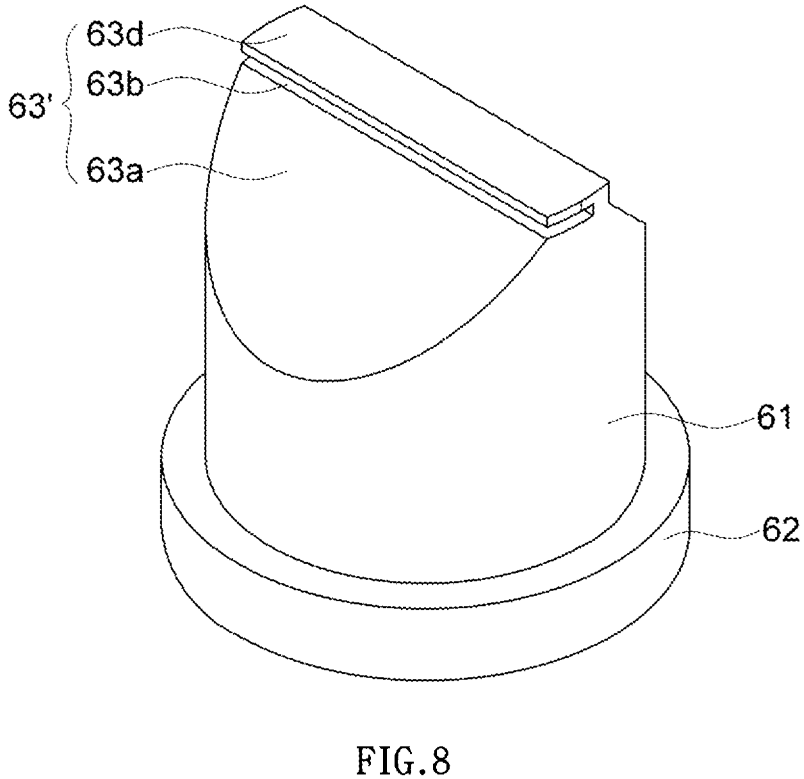
FIGS. 8 and 9 are views illustrating a second embodiment of the check valve.
Figure 9:
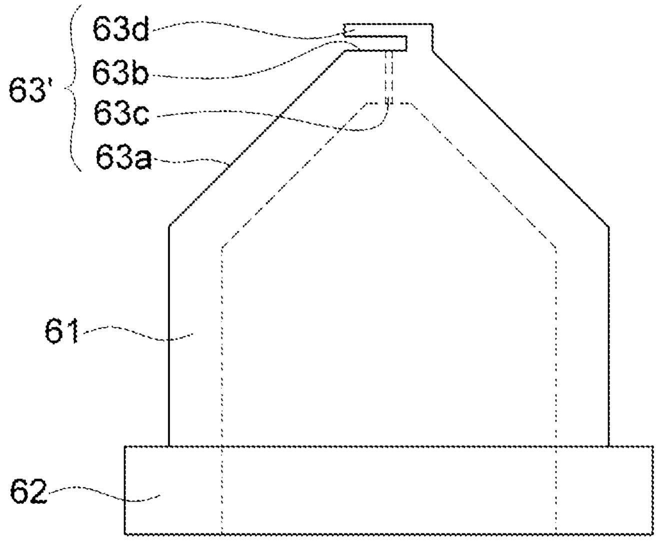

FIGS. 8 and 9 are views illustrating a second embodiment of the check valve.

The second embodiment of the check valve 60 illustrated in FIGS. 8 and 9 differs from the first embodiment of the check valve 60 illustrated in FIGS. 5 to 7 only in terms of a cover 63*d* of a duckbill portion 63'. Therefore, because the other constituent elements of the second embodiment of the check valve 60 are identical to the constituent elements of the first embodiment of the check valve 60, a specific description thereof will be substituted with the above-mentioned contents.

Referring to FIGS. 8 to 9, in the second embodiment of the check valve 60, the duckbill portion 63' further includes the cover 63*d* configured to cover the slit 63*c*.

The cover 63*d* may extend or protrude from the end 63*b* of the other side of the body portion 61. According to the embodiment, the cover 63*d* may be formed in a '¬' shape and cover the slit 63*c*. The cover 63*d* may be integrated with the inclined surfaces 63*a* of the duckbill portion 63' and the end 63*b* of the other side of the body portion 61.

The cover 63*d* covers the slit 63*c* having a predetermined length.

The cover 63*d* may be elongated to have a length longer than a length of the slit 63*c* so as to cover the slit 63*c* having a predetermined length.

The cover 63*d* may be made of rubber, silicone, and/or synthetic elastomer and elastically deformed when the cover 63*d* is pressed by an external force.

In case that the air flows while sequentially passing through the stepped portion 62, the body portion 61, and the duckbill portion 63' through the through-hole in the body portion 61, the air presses the inner surfaces of the inclined surfaces 63*a* of the duckbill portion 63'. The two inclined surfaces 63*a* are elastically deformed by being pressed by the air. The slit 63*c* is widely opened by the elastic deformation of the inclined surfaces 63*a*, such that the air, which presses the inclined surfaces 63*a*, may flow to the outside through the slit 63*c*. When the air having passed through the slit 63*c* presses the cover 63*d* positioned on the slit 63*c*, the cover 63*d* is pushed upward by being elastically deformed. In this case, the air may flow to the outside.

On the contrary, in case that the air presses the duckbill portion 63' from the outside of the check valve 60, the air presses the cover 63*d* and the outer surfaces of the inclined surfaces 63*a* of the duckbill portion 63'. The two inclined surfaces 63*a* are elastically deformed by being pressed by the air. The slit 63*c* is closed by the elastic deformation of the inclined surfaces 63*a*, such that the air existing outside the check valve 60 cannot flow into the check valve 60 through the slit 63*c*. In addition, because the cover 63*d* is elastically deformed by being pressed by the air and covers the slit 63*c*, the air existing outside the check valve 60 cannot flow into the check valve 60 through the slit 63*c*. The cover 63*d* further prevents the air from flowing into the check valve 60 through the slit 63*c*.

Therefore, when the back pressure occurs in the sealed space S, the air existing in the sealed space S flows to the outside of the gear housing 10 through the first check valve 60. Therefore, the back pressure in the sealed space S is eliminated.

When the back pressure in the sealed space S is eliminated and in case that the worm shaft 20 moves upward, the air existing outside the gear housing 10 flows into the sealed space S through the second check valve 60. The second check valve 60 may block foreign substances to prevent introduction of foreign substances when the air flows into the sealed space S.

According to the speed reducer 1 for an electric power steering system according to the embodiment of the present disclosure described above, the plurality of air flow passages 11 is formed to connect the outside of the gear housing 10 and the sealed space S formed in the gear housing 10 (the space formed below the seal bearing 40 in the gear housing 10), and the check valves 60 are respectively disposed in the air flow passages 11, which makes it possible to inhibit the back pressure that occurs in the sealed space S.

Therefore, according to the speed reducer 1 for an electric power steering system according to the embodiment of the present disclosure, the back pressure is eliminated, such that assembling properties are improved, rotational torque of the worm shaft 20 is constantly maintained, and damping performance of the damper is uniformly maintained.

According to the speed reducer 1 for an electric power steering system according to the embodiment of the present disclosure, the check valve 60 may be used to block introduction of foreign substances.

According to the speed reducer 1 for an electric power steering system according to the embodiment of the present disclosure, it is not necessary to separately modify a mold to move air in the gear housing 10, which may reduce manufacturing costs.

The features, structures, effects, and the like described above in the exemplary embodiments are included in at least one embodiment of the present disclosure, but the present disclosure is not necessarily limited to one embodiment. Furthermore, the features, structures, effects, and the like described in the respective embodiments may be combined or modified and then carried out by those skilled in the art as other embodiments. It should be interpreted that the combination and modification are included in the scope of the present disclosure.

The embodiments have been described above, but the embodiments are just illustrative and not intended to limit the present disclosure. It can be appreciated by those skilled in the art that various modifications and alterations, which are not described above, may be made without departing from the intrinsic features of the present disclosure. That is, the respective constituent elements specifically described in the exemplary embodiments may be modified and then carried out. Further, it should be interpreted that the differences related to the modifications and alterations are included in the scope of the present disclosure defined by the appended claims.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A speed reducer for an electric power steering system, the speed reducer comprising:

a gear housing configured to accommodate a worm shaft and a worm wheel;

a plurality of air flow passages formed in the gear housing and configured to connect an outside of the gear housing and a sealed space formed in the gear housing; and a first check valve and a second check valve respectively disposed in different ones of the plurality of air flow passages, wherein the first check valve is configured to allow air to flow only from the sealed space to the outside of the gear housing;

wherein the second check valve is configured to allow air to flow only from the outside of the gear housing to the sealed space;

wherein at least one of the check valves comprises:

a body portion having a tubular shape, a stepped portion formed at one side of the body portion, a duckbill portion formed at another side of the body portion and having a slit; and wherein said at least one of the check valves further comprises a cover extending from an end of the body portion to cover the slit such that the cover blocks foreign substances while permitting press e-responsive air flow.

2. The speed reducer of claim 1, wherein worm shaft bearings are respectively disposed at one side and another side of the worm shaft in the gear housing, wherein one of the worm shaft bearings disposed at said one side of the worm shaft is a seal bearing, and wherein the sealed space is a space having a predetermined size and formed below the seal bearing.

3. The speed reducer of claim 1, wherein the body portion is formed in a cell cylindrical tubular shape.

4. The speed reducer of claim 1, wherein air flows while sequentially passing through the stepped portion, the body portion, and the duckbill portion and does not flow while sequentially passing through the duckbill portion, the body portion, and the stepped portion.

5. The speed reducer of claim 3, wherein the stepped portion is provided at said one side of the body portion along an outer peripheral surface of the body portion and extends or protrudes in a direction perpendicular to a longitudinal direction of the body portion.

6. The speed reducer of claim 1, wherein the duckbill portion further comprises two inclined surfaces and a-slit, wherein the two inclined surfaces are each inclined at a predetermined gradient from a part of said another side of the body portion to an end of said another side of the body portion, wherein the slit is formed at the end of said another side of the body portion and has a predetermined length, and wherein the two inclined surfaces are formed to face each other based on the slit.

7. The speed reducer of claim 6, wherein the cover extends from the end of said another side of the body portion.

8. The speed reducer of claim 1, wherein the check valves are duckbill valves and made of rubber, silicone, or synthetic elastomer.

9. The speed reducer of claim 1, wherein a damper is disposed in the sealed space.

10. The speed reducer of claim 1, wherein the stepped portion of the first check valve is disposed in the sealed space.

11. The speed reducer of claim 1, wherein the stepped portion of the second check valve is disposed to be exposed to the outside of the gear housing.

12. The speed reducer of claim 1, wherein the first and second check valves have the same shape and are disposed in mutually opposite directions.

13. The speed reducer of claim 1, wherein the body portion of said at least one of the fi and id check valves has a through-hole extending in a longitudinal direction to allow air to flow therethrough.

14. The speed reducer of claim 1, wherein the duckbill portion of said at least one of the first and second check valves comprises two inclined surfaces and the slit, the two inclined surfaces being inclined at a predetermined gradient toward the end of the body portion and facing each other with the slit therebetween.

15. The speed reducer of claim 1, wherein, when back pressure in the sealed space is eliminated and the worm shaft moves upward, the second check valve provides an air flow path that enables air existing outside the gear housing to flow into the sealed space while blocking foreign substances.

16. A speed reducer for an electric power steering system, the speed reducer comprising:

a gear housing accommodating a worm shaft and a worm wheel;

a sealed space formed in the gear housing;

a plurality of air flow passages formed in the gear housing and connecting an outside of the gear housing and the sealed space; and check valves respectively disposed in the plurality of air flow passages;

wherein a first check valve, which is one of the check valves respectively disposed in the plurality of air flow passages, allows air to flow to the outside of the gear housing from the sealed space, wherein a second check valve, which is another one of the check valves respectively disposed in the plurality of air flow passages, allows air to flow to the sealed space from the outside of the gear housing, wherein at least one of the check valves is a duckbill valve including a body portion, a stepped portion, and a duckbill portion having two inclined surfaces and a slit, and the duckbill portion further includes a cover configured to cover the slit and extending or protruding from an end of the body portion.

17. The speed reducer of claim 16, wherein the cover is formed in a substantially right-angled shape and has a length longer than a length of the slit to cover the slit.

18. The speed reducer of claim 16, wherein the cover is made of rubber, silicone, or synthetic elastomer and is elastically deformable when pressed by air.

* * * * *